(12) United States Patent
Saito et al.

(10) Patent No.: US 7,929,997 B2
(45) Date of Patent: Apr. 19, 2011

(54) NOISE DETECTING APPARATUS AND AM BROADCAST RECEIVING APPARATUS

(75) Inventors: Yasuji Saito, Ota (JP); Masanori Kudo, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 987 days.

(21) Appl. No.: 11/758,566

(22) Filed: Jun. 5, 2007

(65) Prior Publication Data
US 2008/0008334 A1    Jan. 10, 2008

(30) Foreign Application Priority Data

Jun. 5, 2006   (JP) .................................. 2006-156548

(51) Int. Cl.
*H04B 1/38*    (2006.01)
*H04B 1/10*    (2006.01)
(52) U.S. Cl. ....................... 455/570; 455/278.1; 455/296
(58) Field of Classification Search ................ 455/63.1, 455/114.2, 115.1, 278.1, 296, 501, 67.13, 455/223, 570
See application file for complete search history.

(56) References Cited

U.S. PATENT DOCUMENTS

| 7,113,752 B2 * | 9/2006 | Leinonen et al. | 455/78 |
| 7,315,525 B2 * | 1/2008 | Peltola | 370/328 |
| 7,395,043 B2 * | 7/2008 | Atsumi | 455/226.2 |

FOREIGN PATENT DOCUMENTS

JP    2001-186031    7/2001

* cited by examiner

*Primary Examiner* — Sonny Trinh
(74) *Attorney, Agent, or Firm* — SoCal IP Law Group LLP; Steven C. Sereboff; John E. Gunther

(57) ABSTRACT

A noise detecting apparatus detecting presence or absence of noise in a received signal, comprising: a first band selecting unit configured to select a first signal of a first frequency band that does not include a frequency band of the received signal and is higher than a center frequency of the received signal; a second band selecting unit configured to select a second signal of a second frequency band that does not include the frequency band of the received signal and is lower than the center frequency of the received signal; a signal selecting unit configured to compare strength of the first signal selected by the first band selecting unit and strength of the second signal selected by the second band selecting unit to select the signal of lower strength; and a comparing unit configured to compare the strength of the signal selected by the signal selecting unit with a predetermined threshold to output a signal depending on a result of the comparison.

8 Claims, 5 Drawing Sheets

NOISE DETECTING APPARATUS AND AM BROADCAST RECEIVING APPARATUS

CROSS-REFERENCE TO RELATED APPLICATION

This application claims the benefit of priority to Japanese Patent Application No. 2006-156548, filed Jun. 5, 2006, of which full contents are incorporated herein by reference.

BACKGROUND OF THE INVENTION

1. Field of the Invention

The present invention relates to a noise detecting apparatus and an AM broadcast receiving apparatus that are capable of accurately detecting a short-period noise and effectively removing the short-period noise discharged from a streetcar, a power transmission line, etc.

2. Description of the Related Art

FIG. 6 shows a conventional configuration of an AM broadcast receiving apparatus 1 with a noise removing function. As shown in FIG. 6, the AM broadcast receiving apparatus 1 comprises an antenna 5 for receiving airwaves, an FE unit 10 for tuning and high frequency amplification, an IF unit 12 for frequency conversion and intermediate frequency amplification, a detecting unit 13 for AM detection of a received signal converted to an intermediate frequency signal, a noise detecting apparatus 14 for detecting presence of a noise and outputting a noise detection signal, a noise canceler 15 for removing the noise contained in received signal, an amplifying unit 16 for amplifying an audio signal, and a speaker 17 for outputting an audio.

FIG. 7 shows a configuration of the noise detecting apparatus 14. The noise detecting apparatus 14 comprises a filter 71 for limiting a band of a detected signal output from the detecting unit 13, a low-pass filter 72 for smoothing the signal output from the filter 71, a comparator 73 for comparing the signal output from the low-pass filter 72 with a predetermined threshold and outputting the noise detection signal when the level of the smoothed signal exceeds the threshold (see Japanese Patent Application Laid-Open Publication No. 2001-186031).

In the case of, for example, the AM broadcast receiving apparatus 1 installed in a car, to prevent deterioration of audio quality due to a pulsing noise of a comparatively short period (hereinafter, short-period noise) discharged from the streetcar, the power transmission line, etc., a mechanism to effectively remove the short-period noise is required.

However, the AM broadcast receiving apparatus 1 of the conventional configuration described above can not necessarily remove the short-period noise effectively. Namely, since the conventional noise detecting apparatus 14, as shown in FIG. 7, detects the presence of the noise based on a detected signal of a broad band output from the detecting unit 13, when the frequency of the short-period noise is in proximity to a noise attributable to an adjacent broadcasting station (hereinafter, adjacent disturbing wave), the noise canceler 15 is frequently caused to operate due to the adjacent disturbing wave, resulting in the deterioration of the audio quality of the AM broadcast receiving apparatus 1.

SUMMARY OF THE INVENTION

In order to solve the above problems, according to a major aspect of the present invention there is provided a noise detecting apparatus detecting presence or absence of noise in a received signal, comprising: a first band selecting unit configured to select a first signal of a first frequency band that does not include a frequency band of the received signal and is higher than a center frequency of the received signal; a second band selecting unit configured to select a second signal of a second frequency band that does not include the frequency band of the received signal and is lower than the center frequency of the received signal; a signal selecting unit configured to compare strength of the first signal selected by the first band selecting unit and strength of the second signal selected by the second band selecting unit to select the signal of lower strength; and a comparing unit configured to compare the strength of the signal selected by the signal selecting unit with a predetermined threshold to output a signal depending on a result of the comparison.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 1 is a block diagram of a superheterodyne-system, AM broadcast receiving apparatus 1 according to an embodiment of the present invention;

FIG. 2 is a block diagram of a noise detecting apparatus 14 according to an embodiment of the present invention;

FIG. 3 shows a frequency response curve of a first band-pass filter 1421 and a second band-pass filter 1431 shown as an example of setting of the first band-pass filter 1421 and the second band-pass filter 1431 according to an embodiment of the present invention;

FIG. 4A is a waveform chart for description of processing to be performed by a noise detecting apparatus 14 according to an embodiment of the present invention and shows an example of the waveform of an IF signal containing a short-period noise;

FIG. 4B is a chart for description of processing to be performed by a noise detecting apparatus 14 according to an embodiment of the present invention and shows frequency characteristics of the IF signal shown in FIG. 4A;

FIG. 4C shows a waveform of signals output from the first band-pass filter 1421 and the second band-pass filter 1431, respectively, according to an embodiment of the present invention;

FIG. 4D shows a waveform of signals output from a first full-wave rectifying unit 1422 and a second full-wave rectifying unit 1432, respectively, according to an embodiment of the present invention;

FIG. 4E shows a waveform of signals output from a first low-pass filter 1423 and a second low-pass filter 1433, respectively, according to an embodiment of the present invention;

FIG. 5 is a chart of a relationship between field strength of a received signal and signal strength of a white noise contained in the received signal according to an embodiment of the present invention;

FIG. 6 is a block diagram of the AM broadcast receiving apparatus 1 having a noise removing function; and FIG. 7 is a block diagram of the noise detecting apparatus 14 shown in FIG. 6.

DETAILED DESCRIPTION OF THE INVENTION

At least the following details will become apparent from descriptions of this specification and of the accompanying drawings.

A noise detecting apparatus according to the present invention is so configured as to output a signal depending on result of comparison by comparing strength of a first signal selected by a first band selecting unit and the strength of a second signal selected by a second band selecting unit, selecting the signal of lower strength thereby selecting the signal of a frequency band less affected by an adjacent disturbing wave, and comparing the strength of the selected signal with a predetermined threshold. This enables detecting presence or absence of a short-period noise by the signal in the frequency band less affected by the adjacent disturbing wave and effectively removing the short-period noise by using the signal output by the noise detecting apparatus according to the present invention.

When the received signal is a signal based on airwaves transmitted from a broadcasting station, if a first frequency band or a second frequency band includes a center frequency of the airwaves of other broadcasting station broadcasting at the frequency adjacent to the frequency at which a desired broadcasting station is broadcasting, a comparing unit always selects a signal of one frequency band, out of the first frequency band and the second frequency band, in which the center frequency of the airwaves of other broadcasting station is not included. For this reason, it is preferable to set each of the first frequency band and the second frequency band at such a band that does not include the center frequency of the airwaves of other broadcasting station broadcasting at the frequency adjacent to the frequency at which the desired broadcasting station is broadcasting.

Figure 1:
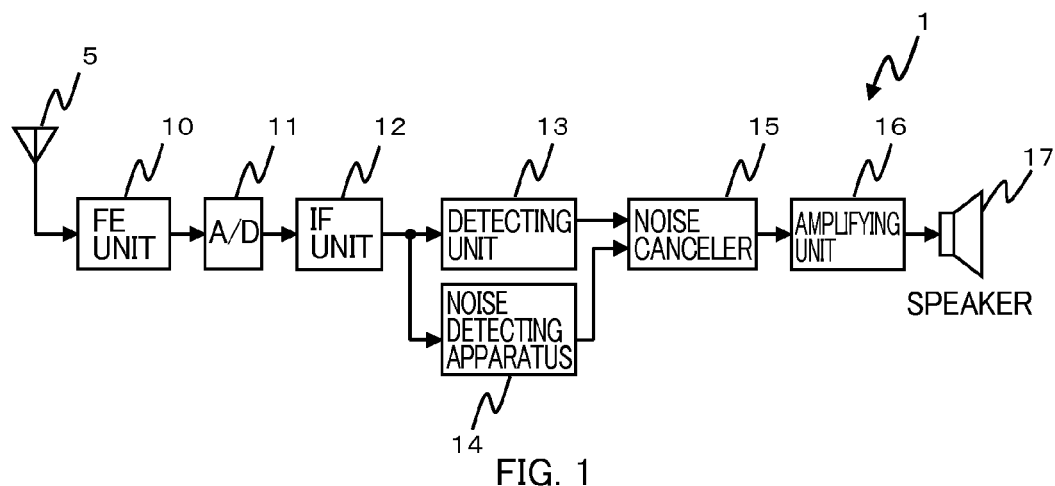

Detailed description will then be made of embodiments of the present invention. FIG. 1 shows a configuration of a superheterodyne-system, AM broadcast receiving apparatus 1 to be described as an embodiment of the present invention. As shown in FIG. 1, the AM broadcast receiving apparatus 1 comprises an antenna 5 for receiving airwaves, an FE unit 10 (FE: Front End) for tuning and high frequency amplification of the received signal, an A/D converter 11 for sampling a signal output from the FE unit 10 and converting it to a digital signal, an IF unit 12 for converting the received signal to an intermediate frequency signal and performing intermediate frequency amplification, a detecting unit 13 for detecting AM, a noise detecting apparatus 14 for detecting presence of a noise and outputting a noise detection signal, a noise canceler 15 for performing processing to remove the noise, an amplifying unit 16 for amplifying an audio signal, and a speaker 17 for outputting an audio based on the signal output from the noise canceler 15. The noise detecting apparatus 14 and the noise canceler 15 are realized by using, for example, a DSP (Digital Signal Processor).

The noise canceler 15 utilizes the noise detection signal as a signal for defining the timing in processing of interpolation for a noise part of the received signal. The noise canceler 15 effectively removes the noise from the received signal by identifying a period during which the noise is present by the noise detection signal and interpolating thus identified period with a waveform based on the waveform of the audio signal preceding and following such period. In the AM broadcast receiving apparatus 1 according to the embodiments of the present invention, the noise detecting apparatus 14 detects the presence or absence of the noise based on the IF signal output from the IF unit 12.

Figure 2:
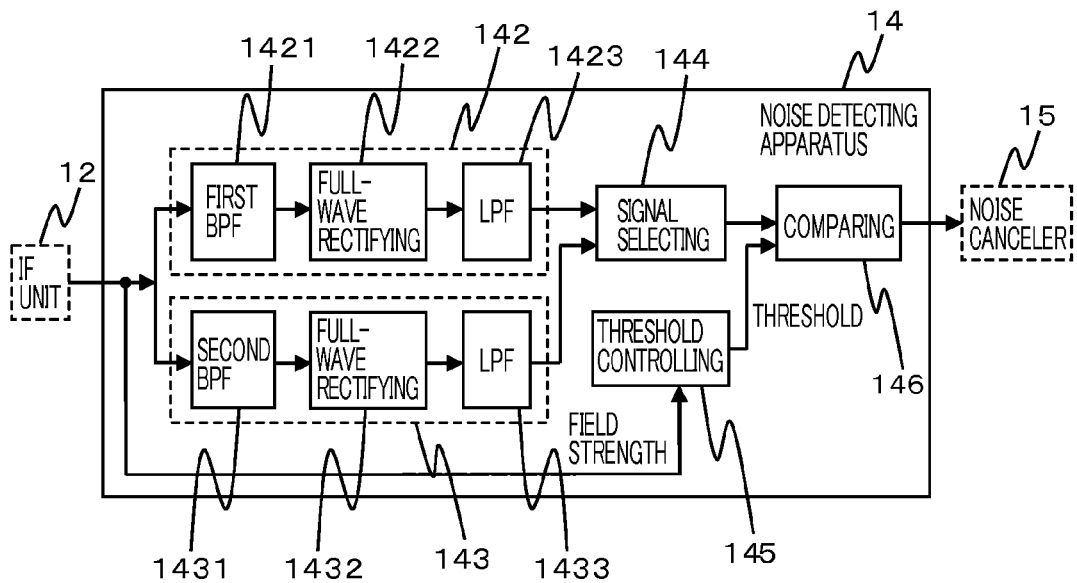

FIG. 2 shows a configuration of the noise detecting apparatus 14. The noise detecting apparatus 14 comprises a first band selecting unit 142 and a second band selecting unit 143 to both of which the signal output from the IF unit 12 is input, a signal selecting unit 144 that compares strength of a first signal selected by the first band selecting unit 142 and strength of a second signal selected by the second band selecting unit 143 and selects and outputs the signal of lower strength, a threshold controlling unit 145 that outputs a threshold set depending on field strength of the IF signal, and a comparing unit 146 that compares the strength of the signal output from the signal selecting unit 144 with a predetermined threshold output from the threshold controlling unit 145 and outputs the noise detection signal when the strength of the signal output from the signal selecting unit 144 is higher than the threshold.

The first band selecting unit 142 comprises a first band-pass filter 1421, a first full-wave rectifying unit 1422 that performs full-wave rectification of the signal band-limited by the first band-pass filter 1421, and a first low-pass filter 1423 that smoothes the signal rectified by the first full-wave rectifying unit 1422. The second band selecting unit 143 comprises a second band-pass filter 1431, a second full-wave rectifying unit 1432 that performs full-wave rectification of the signal band-limited by the second band-pass filter 1431, and a second low-pass filter 1433 that smoothes the signal rectified by the second full-wave rectifying unit 1432.

The band of the first band-pass filter 1421 of the first band selecting unit 142 is set so as to select the signal of the first frequency band that does not include the frequency band of the IF signal (received signal) and is higher than the center frequency of the IF signal. The band of the second band-pass filter 1431 of the second band selecting unit 143 is set so as to select the signal of the second frequency band that does not include the frequency band of the IF signal (received signal) and is lower than the center frequency of the IF signal. The first frequency band and the second frequency band are set in a symmetrical relationship relative to the center frequency of the IF signal (received signal). Furthermore, the first frequency band and the second frequency band are set at the frequency band that does not include the center frequency of the airwaves of other broadcasting station broadcasting at the frequency adjacent to that of a desired broadcasting station.

Figure 3:
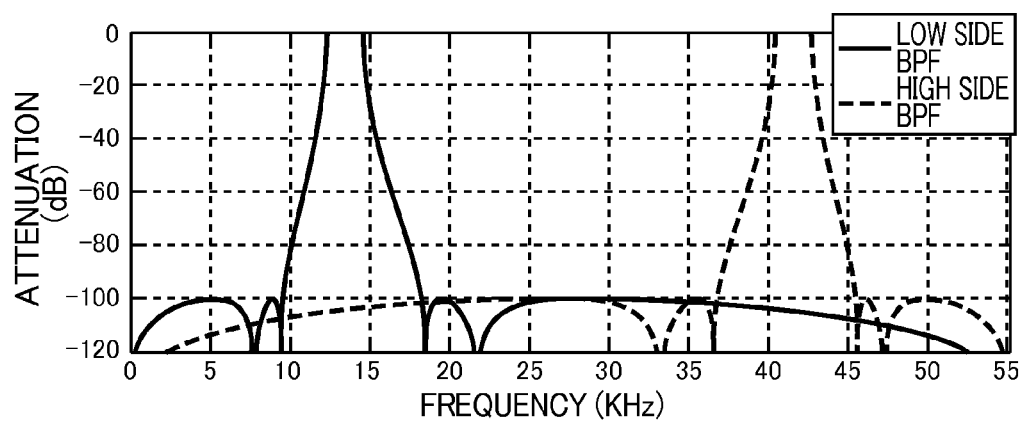

FIG. 3 represents an example of setting of the first band-pass filter 1421 and the second band-pass filter 1431 when the AM broadcast receiving apparatus 1 is an AM medium wave radio broadcast receiving apparatus to receive the airwaves of broadcasting stations in Japan and shows a frequency response curve of the first band-pass filter 1421 and the second band-pass filter 1431. FIG. 3 represents the case in which a sampling frequency of the A/D converter 11 is set at 110.25 kHz and the center frequency of the IF signal is set at 27.5625 kHz, and each of the first frequency band of the first band-pass filter 1421 and the second frequency band of the second band-pass filter 1431 is set at the band that does not include the frequency band of the IF signal (27.5625 kHz±7.5 kHz).

Generally, signal strength of the adjacent disturbing wave is higher than that of the short-period noise. The adjacent disturbing wave appears stronger at either one of the first frequency band higher than the center frequency of the received signal and the second frequency band lower than the center frequency of the received signal. For this reason, by comparing the strength of the first signal selected by the first band selecting unit 142 and the strength of the second signal selected by the second band selecting unit 143 and selecting the signal of lower strength out of these signals, the band less affected by the adjacent disturbing wave is selected, and, by comparing the strength of the signal of this band with the threshold, the shot-period noise can accurately be detected and can effectively be removed.

If the first frequency band or the second frequency band includes the center frequency of the airwaves of other broadcasting station broadcasting at the frequency adjacent to the frequency at which the desired broadcasting station is broadcasting, the comparing unit 146 always selects the signal of one frequency band, out of the first frequency band and the second frequency band, in which the center frequency of the airwaves of other broadcasting station is not included. For this reason, each of the first frequency band and the second frequency band is set at such a band that does not include the center frequency of the airwaves of other broadcasting station broadcasting at the frequency adjacent to the frequency at which the desired broadcasting station is broadcasting.

Namely, since, in the case of Japan, the frequency of the broadcasting stations is assigned at intervals of 9 kHz, in the example of FIG. 3, each of the first frequency band of the first band-pass filter 1421 and the second frequency band of the second band-pass filter 1431 is set at the band that does not include the center frequency (0.5625 kHz, 9.5625 kHz, 18.5625 kHz, 36.5625 kHz, 45.5625 kHz, and 54.5625 kHz) of the airwaves of other broadcasting stations adjacent such as ±9 kHz, ±18 kHz, and ±27 kHz relative to the center frequency (27.5625 kHz) of the IF signal (received signal).

While in FIG. 3, the center frequency (27.5625 kHz) of the IF signal is set at ½ of the Nyquist frequency (55.125 kHz), such setting facilitates design of the band-pass filter.

<Description of Processing>

Detailed description will then be made of processing performed by the noise detecting apparatus 14, with reference to the waveforms shown in FIGS. 4A to 4E.

Figure 4A:
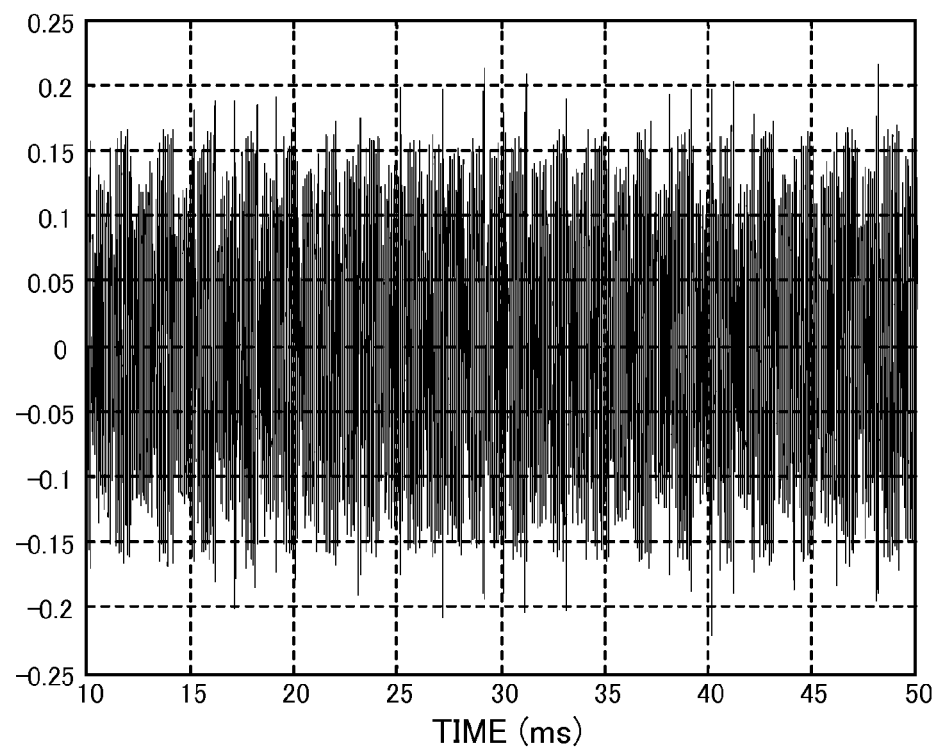
Figure 4B:
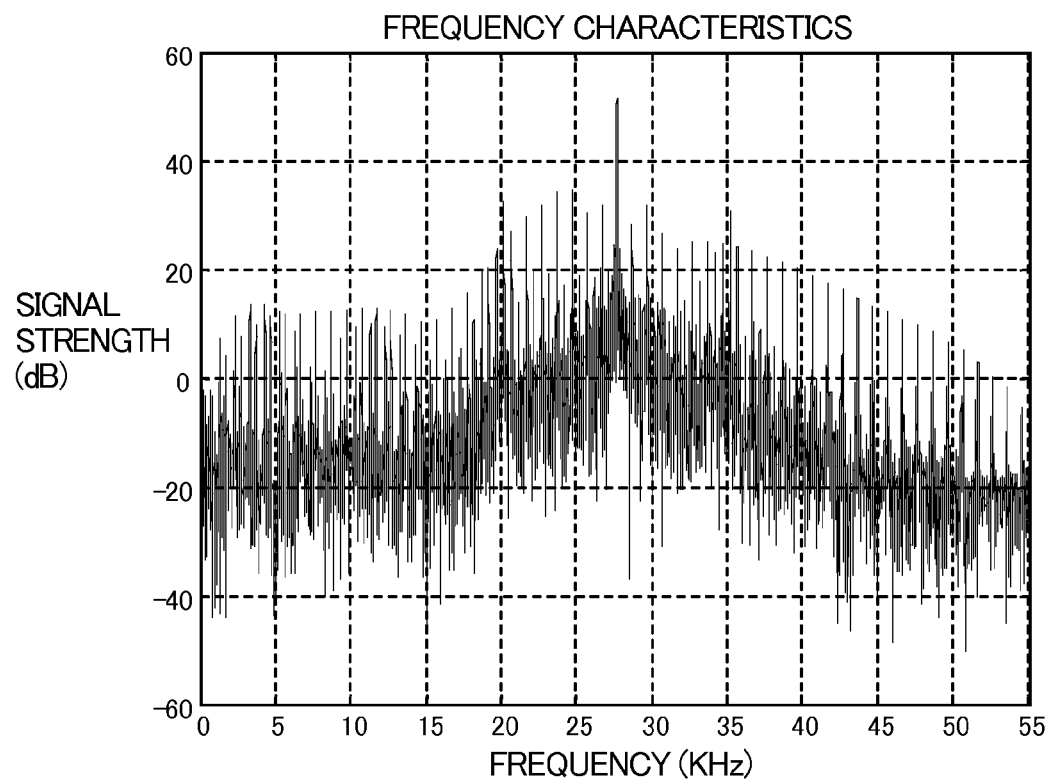
Figure 4C:
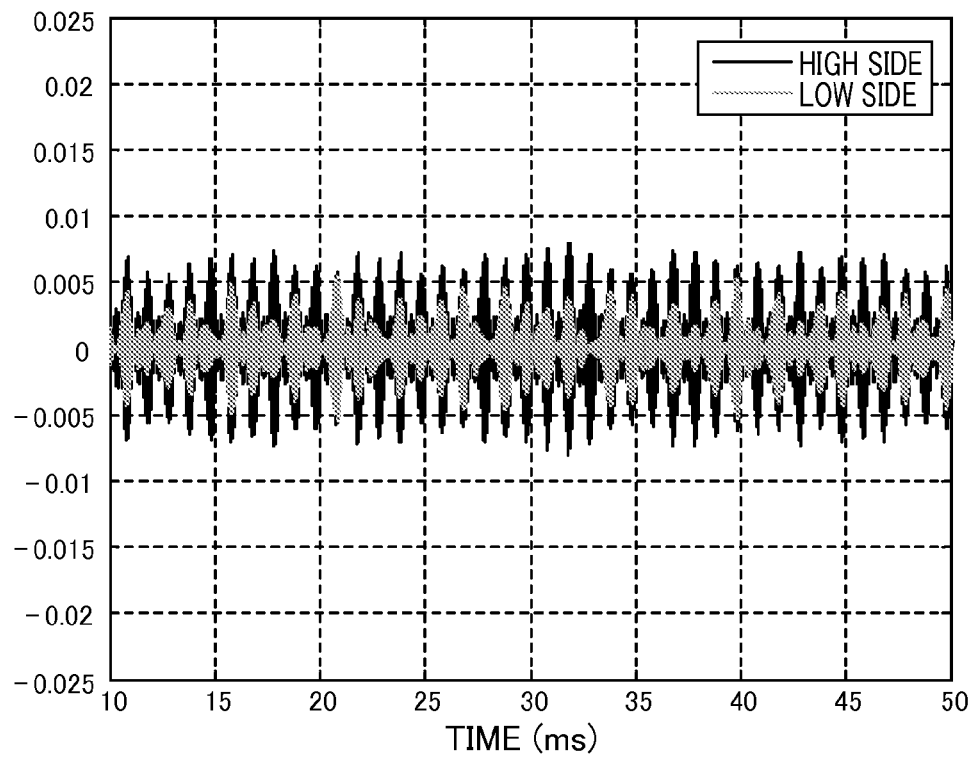

FIG. 4A shows an example of the waveform of the IF signal containing the short-period noise input from the IF unit 12 to the noise detecting apparatus 14, and FIG. 4B shows frequency characteristics of the IF signal shown in FIG. 4A. The signal input from the IF unit 12 to the noise detecting apparatus 14 is input to the first band selecting unit 142 and the second band selecting unit 143. The signal input to the first band selecting unit 142 is band-limited by the first band-pass filter 1421. The signal input to the second band selecting unit 143 is band-limited by the second band-pass filter 1431. The waveforms of the signal output from the first band-pass filter 1421 (High side) and the signal output from the second band-pass filter 1431 (Low side) are shown in FIG. 4C.

Figure 4D:
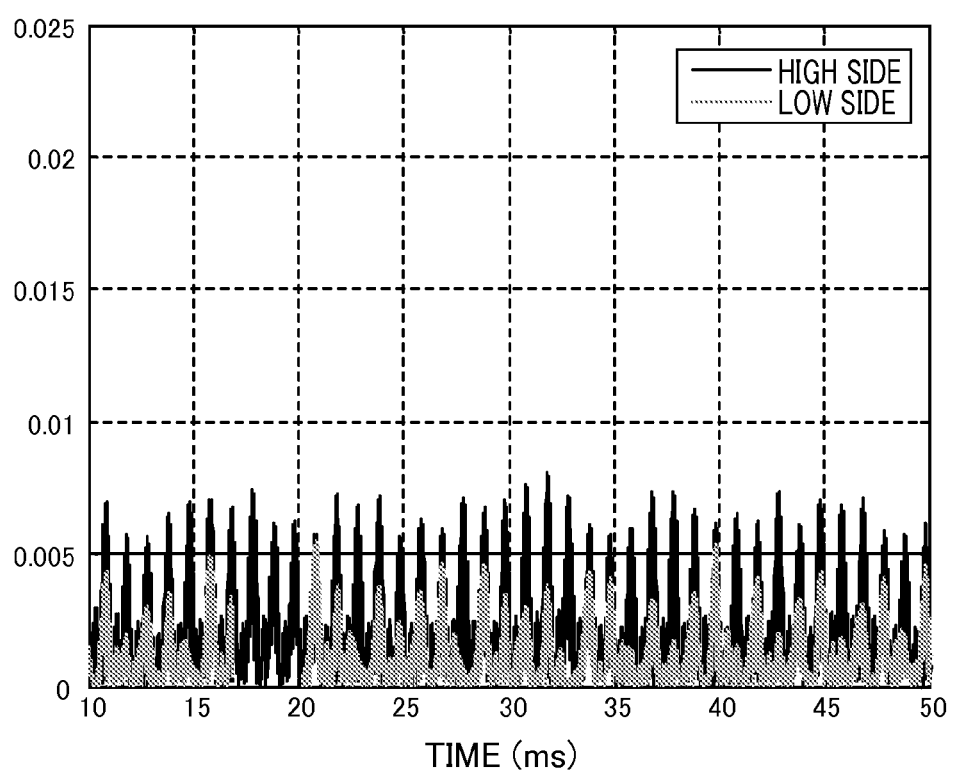

The signal band-limited by the first band-pass filter 1421 undergoes the full-wave rectification at the first full-wave rectifying unit 1422. The signal band-limited by the second band-pass filter 1431 undergoes the full-wave rectification at the second full-wave rectifying unit 1432. The signal output from the first full-wave rectifying unit 1422 (High side) and the signal output from the second full-wave rectifying unit 1432 (Low side) are shown in FIG. 4D.

Figure 4E:
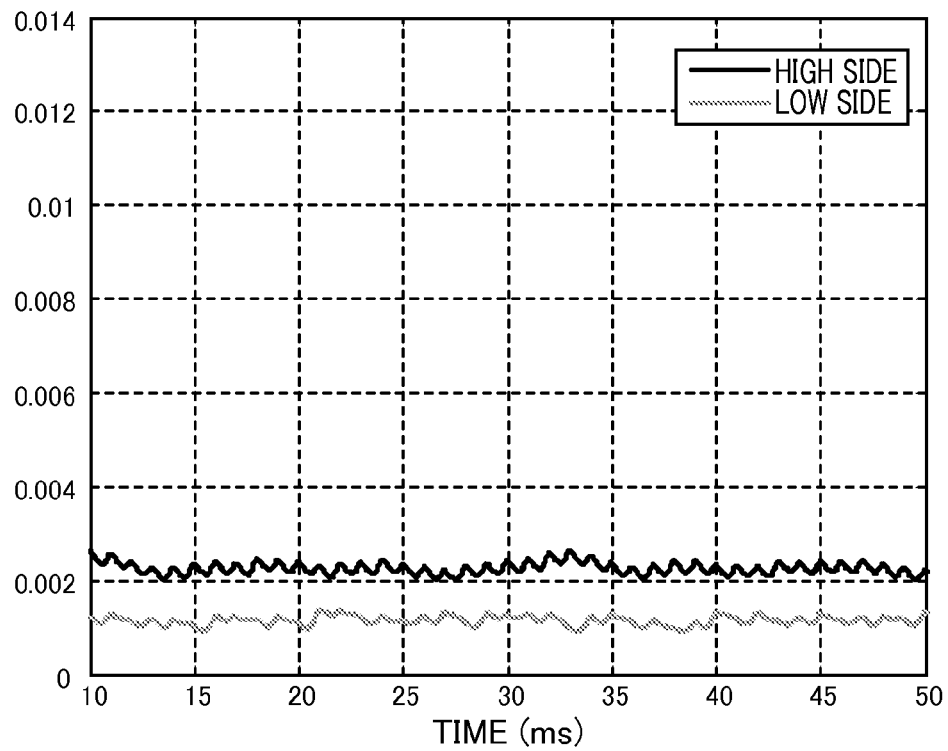

The signal that has undergone the full-wave rectification by the first full-wave rectifying unit 1422 is smoothed at the first low-pass filter 1423. The signal that has undergone the full-wave rectification by the second full-wave rectifying unit 1432 is smoothed at the second low-pass filter 1433. The signal output from the first low-pass filter 1423 (High side) and the signal output from the second low-pass filter 1433 (Low side) are shown in FIG. 4E.

The signal selecting unit 144 compares the strength of the signal output from the first low-pass filter 1423 and the strength of the signal output from the second low-pass filter 1433, and selects to output the signal of lower strength. In FIG. 4E, the strength of the signal output from the second low-pass filter 1433 is lower and in this case, the signal output from the second low-pass filter 1433 is selected.

The comparing unit 146 compares the strength of the signal output from the signal selecting unit 144 with the threshold output from the threshold controlling unit 145 and outputs the signal (noise detection signal) depending on the result of the comparison. Here, the noise detection signal is, for example, a signal that assumes one logical value (High or low) if the strength of the signal output from the signal selecting unit 144 is higher than the threshold output from the threshold controlling unit 145 and assumes the other logical value if the strength of the signal output from the signal selecting unit 144 is lower than the threshold output from the threshold controlling unit 145. Based on this noise detection signal, the noise canceler 15 performs the interpolation for the period during which the noise is present, thereby effectively removing the short-period noise from the received signal.

<Method of Setting Threshold>

Figure 5:
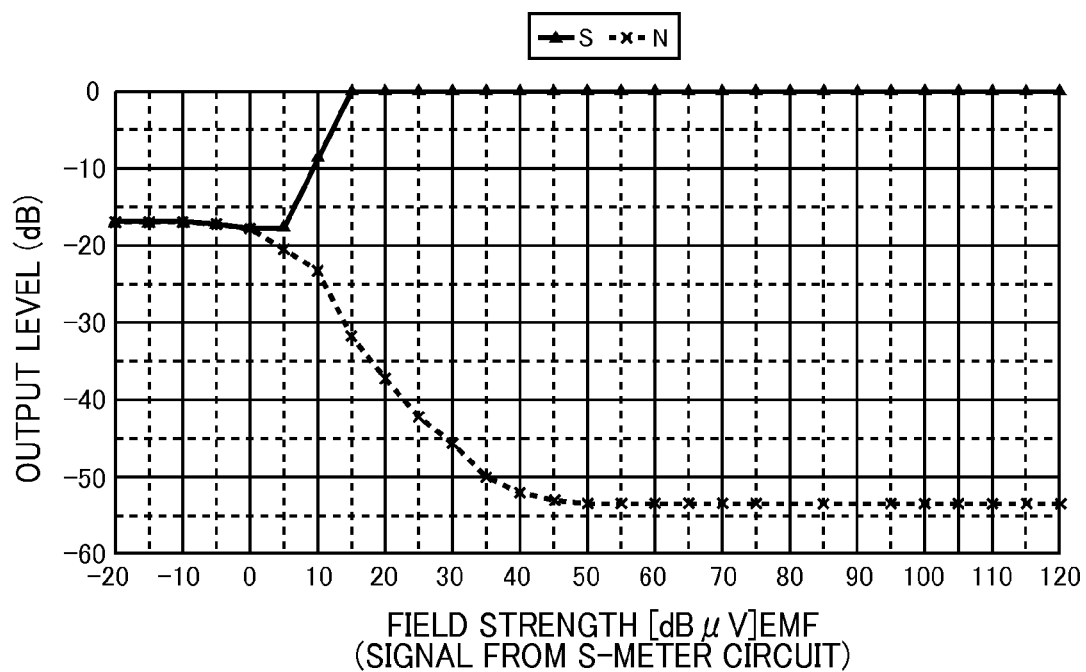
Figure 6:
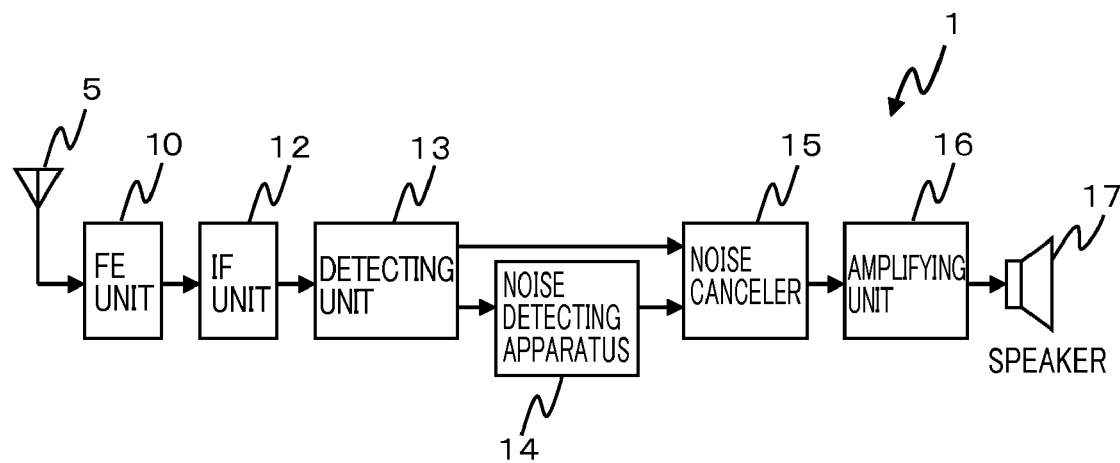
Figure 7:
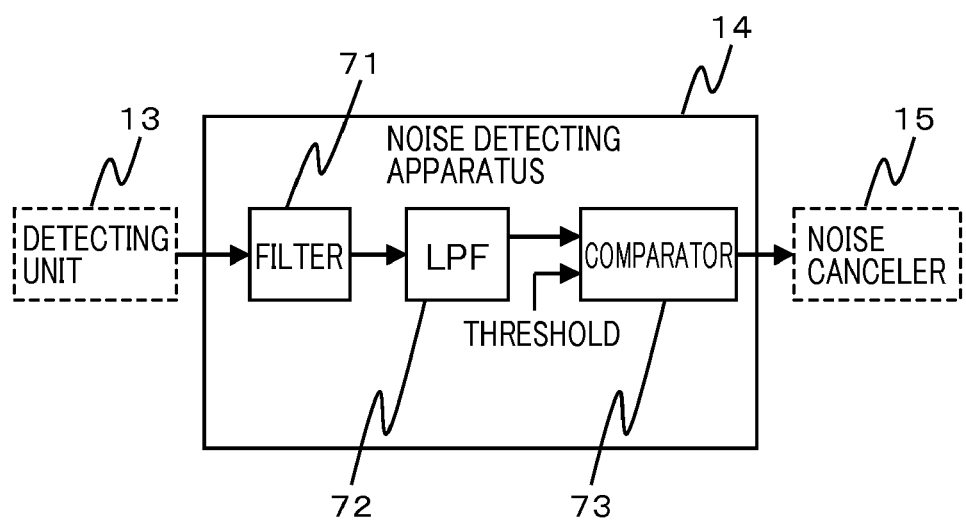

The threshold to be compared by the comparing unit 146 with the strength of the signal selected by the signal selecting unit 144 is set at a value suitable for judging the presence or absence of the short-period noise based on experimental values, etc. It may be so arranged that, for example, a data storage memory is provided in the noise detecting apparatus 14, the relationship between the field strength of the received signal and the signal strength of the white noise contained in the received signal (see FIG. 5) is stored in the memory, and the threshold controlling unit 145 sets the threshold at a value somewhat greater than the signal strength of the white noise corresponding to the current field strength of the received signal. By so arranging that the threshold is set at such a value, the noise detecting apparatus 14 can be prevented from erroneously detecting the white noise as the short-period noise. It is so arranged that for example, an S-meter circuit is provided at the IF unit 12, etc., and the field strength of the received signal is obtained from the S-meter circuit.

The above embodiments of the present invention are simply for facilitating the understanding of the present invention and are not in any way to be construed as limiting the present invention. The present invention may variously be changed or altered without departing from its spirit and encompass equivalents thereof.

It is claimed:

1. A noise detecting apparatus detecting presence or absence of noise in a received signal, comprising:
    a first band selecting unit configured to select a first signal of a first frequency band that does not include a frequency band of the received signal and is higher than a center frequency of the received signal;
    a second band selecting unit configured to select a second signal of a second frequency band that does not include the frequency band of the received signal and is lower than the center frequency of the received signal;
    a signal selecting unit configured to compare strength of the first signal selected by the first band selecting unit and strength of the second signal selected by the second band selecting unit to select the signal of lower strength; and
    a comparing unit configured to compare the strength of the signal selected by the signal selecting unit with a predetermined threshold to output a signal depending on a result of the comparison.

2. The noise detecting apparatus of claim 1, wherein
    the received signal includes a signal based on airwaves transmitted from a broadcasting station, and wherein
    each of the first frequency band and the second frequency band is set at a band that does not include a center frequency of airwaves of other broadcasting station broadcasting at a frequency adjacent to that of the broadcasting station.

3. The noise detecting apparatus of claim 1, wherein
    the first band selecting unit or the second band selecting unit further comprises a band-pass filter, a full-wave rectifying unit configured to perform full-wave rectification of a signal having passed through the band-pass filter, and a low-pass filter smoothing a signal output from the full-wave rectifying unit.

4. The noise detecting apparatus of claim 1, wherein
the signal depending on the result of the comparison output from the comparing unit includes a signal for defining a timing in processing of interpolation for a noise part of the received signal.

5. The noise detecting apparatus of claim 1, further comprising a threshold controlling unit configured to set the threshold depending on electric field strength of the received signal.

6. The noise detecting apparatus of claim 5, wherein
the threshold controlling unit memorizes a relationship between the electric field strength of the received signal and signal strength of white noise in the received signal, and wherein
the threshold controlling unit sets the threshold at a value greater than the signal strength of the white noise corresponding to the current electric field strength of the received signal.

7. An AM broadcast receiving apparatus comprising:
a front end unit configured to perform high frequency amplification of a received signal;
an IF unit configured to convert the received signal to an intermediate frequency signal;
a detecting unit configured to detect the received signal;
a noise detecting apparatus configured to output a noise detection signal that is a signal indicating presence or absence of noise in the received signal; and
a noise canceler configured to perform processing for removing noise in the received signal based on the noise detection signal, wherein
the noise detecting apparatus further comprises:
a first band selecting unit configured to select a first signal of a first frequency band that does not include a frequency band of the received signal and is higher than a center frequency of the received signal;
a second band selecting unit configured to select a second signal of a second frequency band that does not include the frequency band of the received signal and is lower than the center frequency of the received signal;
a signal selecting unit configured to compare strength of the first signal selected by the first band selecting unit and strength of the second signal selected by the second band selecting unit to select the signal of lower strength; and
a comparing unit configured to compare the strength of the signal selected by the signal selecting unit with a predetermined threshold to output a signal depending on a result of the comparison.

8. The AM broadcast receiving apparatus of claim 7, wherein
the received signal includes a signal based on airwaves transmitted from a broadcasting station, wherein
each of the first frequency band and the second frequency band is set at a band that does not include the center frequency of airwaves of other broadcasting station broadcasting at a frequency adjacent to that of the broadcasting station.

* * * * *